United States Patent [19]

LaVenture

[11] 4,034,232

[45] July 5, 1977

[54] SYSTEM FOR SYNCHRONIZING AND PHASE SHIFTING SWITCHING REGULATORS

[75] Inventor: Orville W. LaVenture, Covina, Calif.

[73] Assignee: Burroughs Corporation, Detroit, Mich.

[22] Filed: June 1, 1976

[21] Appl. No.: 691,867

[52] U.S. Cl. .................................. 307/32; 307/82; 323/17; 323/25; 363/25

[51] Int. Cl.² ........................................ H02M 5/453

[58] Field of Search ............. 321/2; 323/17, 23, 25; 307/11, 12, 31, 32, 33, 38, 39, 40, 41, 82

[56] References Cited

UNITED STATES PATENTS

| | | | |
|---|---|---|---|
| 3,543,139 | 11/1970 | Greene | 307/38 |
| 3,742,330 | 6/1973 | Hodges et al. | 323/4 |
| 3,815,015 | 6/1974 | Swin et al. | 323/25 |
| 3,851,651 | 12/1974 | Icenbice, Jr. | 307/41 |

Primary Examiner—Gerald Goldberg

Attorney, Agent, or Firm—Alfred W. Kozak; Nathan Cass; Kevin R. Peterson

[57] ABSTRACT

A regulated power supply system, for a sensitive computer environment, having a plurality of switching regulators to provide highly regulated D.C. voltage to individual loads connected to each of the regulators. A centralized oscillator is used to supply the clock signal to the control circuit of each of the different switching regulators. Thus, any radio frequency interference problems will be associated with only one fundamental frequency and its related harmonics. A modified ring counter is used to stagger the turn-on point of each individual regulator so that the power demands on the source of power are not suddenly severe and instantaneous, which might generate transients disruptive of computer operations. Further, the modified ring counter is used to synchronize the frequency of each regulator to a common clock, in addition to its controlling the phase shifting of each regulator for a staggered turn-on.

4 Claims, 7 Drawing Figures

SYSTEM FOR SYNCHRONIZING AND PHASE SHIFTING SWITCHING REGULATORS

FIELD OF THE INVENTION

This disclosure relates to the subject of regulated power supply systems, especially of the driven switching regulator type and provisions for making optimal use of such power supply systems in a sensitive environment such as involved in computer systems.

BACKGROUND OF THE INVENTION

In recent years a variety of electronic systems making use of switching regulators as part of the regulating functions of the systems have come into use. These switching regulators are also used in many types of regulated power supply systems. There are, however, problems associated with switching regulators in that, since they are switched at very high frequencies, they have a tendency to introduce radio frequency interference (RFI) into their environment, into their D.C. outputs and sometimes back into the A.C. power supply source lines. The RFI problem is normally handled by substantial filtering and shielding which may involve substantial design and material costs if each regulator in the system is operating at a different frequency and without a synchronization pattern between the switching regulators.

Further, when a group of individual switching regulators, connected to a common voltage supply line, are used to supply different individual loads, a synchronized turn-on of power by each switching regulator would create a heavily severe instantaneous power demand. Thus, it would be desirable to have some means by which each individual regulator in the system would not turn-on at the same time as any of the other regulators in the system.

Accordingly, one feature of the invention is to provide improved means for controlling the switching frequency of two or more switching regulators in a manner so as to simplify the system filtering of radio frequency interference. Another feature of the invention is to provide improved means for controlling the phasing of the individual switching regulators so that the power demands of the various regulators occur at differently phased intervals rather than at the same time.

SUMMARY OF THE INVENTION

In a preferred embodiment of the invention a regulated power supply is provided using a plurality of switching regulators having a common switching frequency while at the same time providing for a predetermined difference in the phasing therebetween, so as to maintain the instantaneous power demand required from the power source at an acceptable level. In other words, the power drawn by each of the switching regulators in such a system involving a plurality of regulators is so phased that there is a staggering of demand rather than one simultaneous demand for power by each of the group of switching regulators. Further, since each of the switching regulators is made to operate at the same common switching frequency, then any radio frequency interference (RFI) generated can easily be eliminated by filtering action fairly economically, since only one small frequency or band of frequencies needs to be filtered.

In a particular preferred form of the invention, a regulator "control circuit" uses an operational amplifier as an analog/digital (A/D) converter which senses the differences between a desired standard reference voltage and a regulated output voltage. The regulator control circuit generates a pulse, the duration of which is directly proportional to the amount of energy required to maintain a constant output voltage. A ring counter, for providing a series of differently phased clocking signals, is used to control the operational of the control circuits of each switching regulator in the system so that the clocking frequency controlling any one switching regulator will have a different phasing from that controlling any other switching regulator in the system. Thus, while the frequency switching of transistors in the various regulators of the system will be the same, it is also possible to control the individual regulators so that the "on-time" of their duty cycles will be staggered in relationship to the duty cycles of other regulators in the system. This will provide for an evening-out of demand by the switching regulators on the main power source which will have a significant effect in reducing transients and power variations in the system, to thus minimize unwanted noise. Thus, the system is capable of synchronizing the switching of a bank of regulators for easier diminution of radio frequency interference while at the same time phase shifting the power demands of the regulators to minimize system noise.

DESCRIPTION OF THE PREFERRED EMBODIMENT

Figure 1:
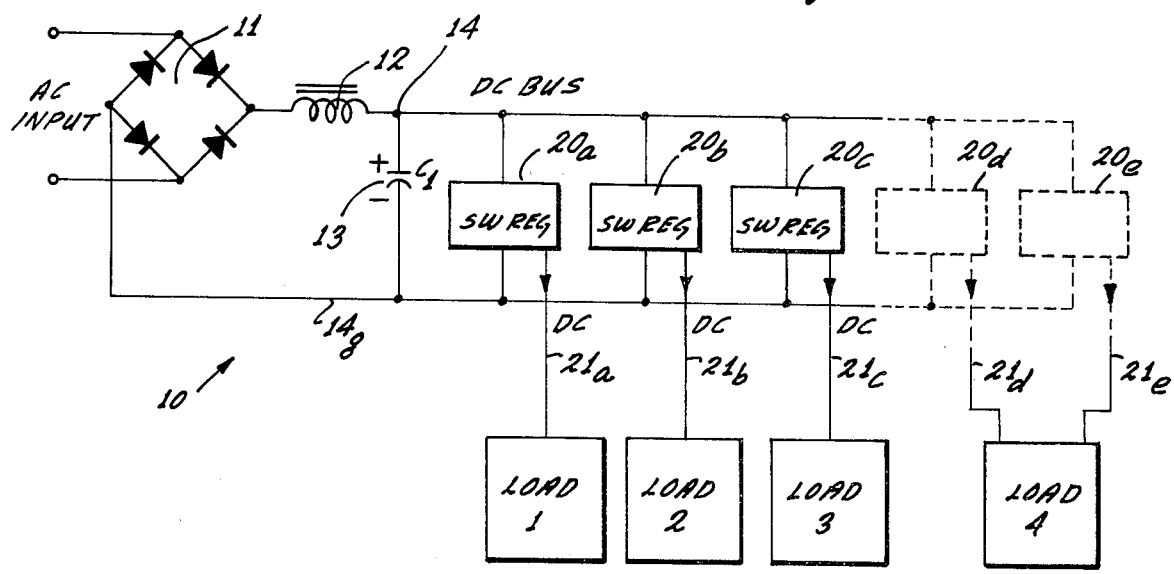
FIG. 1 is a schematic of an overall power supply system using switching regulators to regulate voltage to a plurality of loads.

Referring to FIG. 1, there is illustrated a regulated power supply system 10 using switching regulators for delivery of regulated power to a variety of loads. A.C. input power is used to energize a full wave rectifier bridge 11 which provides an output that is filtered by inductor 12 and capacitor 13 to provide an unregulated output voltage on D.C. bus 14, having a low-end lead or ground lead $14_a$. A group of switching regulators $20_a$, $20_b$, $20_c$, $20_d$, $20_e$ are shown connected across the unregulated D.C. output bus 14 in order to provide a regulated voltage output via output lines $21_a$ through $21_e$ to a series of loads as, for example load 1 through load 4.

Each individual switching regulator is used to provide regulated power to a separate load except when, for example, the load is unusually heavy, a pair of switching regulators may be connected in parallel to provide power for a load such as illustrated by load 4 which is supplied by to switching regulators $20_d$ and $20_e$.

Figure 2:
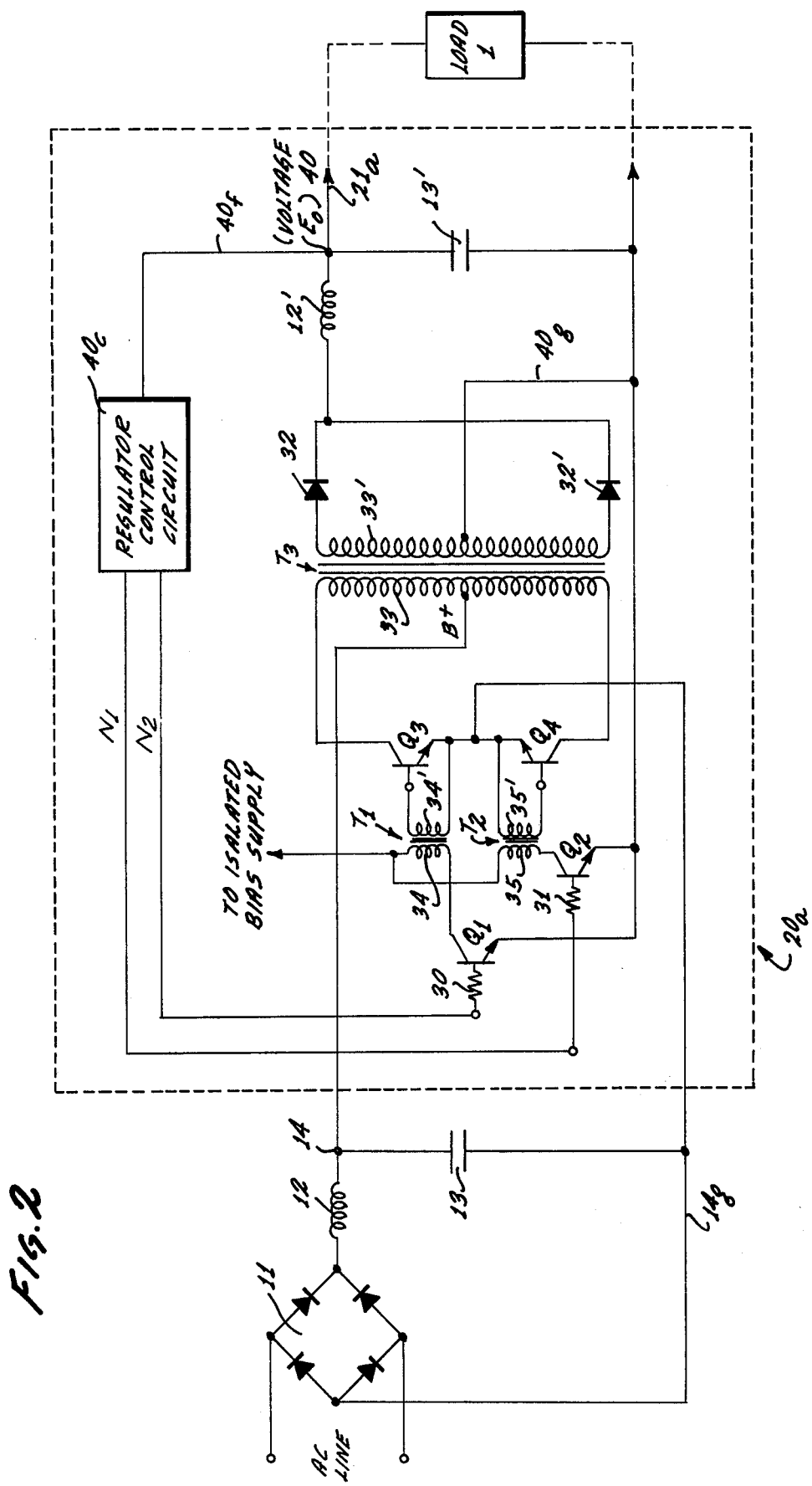
FIG. 2 is a diagram of that individual switching regulator system for providing controlled and regulated voltage to a single load.

Referring to FIG. 2, there is seen in more detail the elements of the switching regulator such as $20_a$ and its relationship to load 1. Full wave rectifier bridge 11 supplies unregulated voltage to D.C. bus 14 after filtering by inductor 12 and capacitor 13. Transformer $T_3$ transfers a compensatory A.C. component voltage via windings 33 to 33' and rectifiers 32 and 32' to provide an output voltage $E_o$ across lines $21_a$ and $40_g$ for application to load 1. Inductor 12' and capacitor 13' help filter any further remaining A.C. components.

The regulated output voltage $E_o$ (or proportion thereof, not shown) is conveyed along line $40_f$ to a regulator circuit control $40_c$ (described in connection with FIG. 3) which cooperates in conjunction with a series of switching transistors to help provide the regulated output voltage $E_o$. Control circuit $40_c$ is seen to have two output lines $N_1$ and $N_2$ which connect to the base of transistors $Q_1$ and $Q_2$ via resistors 30 and 31 respectively.

The collector of transistor $Q_1$ connects to a transformer $T_1$ having windings 34 and 34' which connect across the base and emitter of the transistor $Q_3$. Likewise, transistor $Q_2$ has its collector connected to another transformer $T_2$ having windings 35 and 35' and wherein the winding 35' connects across the base and emitter of transistor $Q_4$. Both emitters of transistors $Q_3$ and $Q_4$ are connected to the isolated D.C. common lead $14_g$. The collectors of transistors $Q_3$ and $Q_4$ connect to a transformer $T_3$ having a winding 33 with a center tap which connects to the D.C. unregulated bus 14. The secondary winding 33' of transformer $T_3$ has a center tap line $40_g$ which goes to the low side of load 1 on its D.C. common line $40_g$. Winding 33' of transformer $T_3$ is furnished with two rectifiers 32 and 32' to provide for one voltage side of the output line $21_a$ which connects to load 1. Inductor 12' and capacitor 13' help provide further filtering activity.

Figure 3:
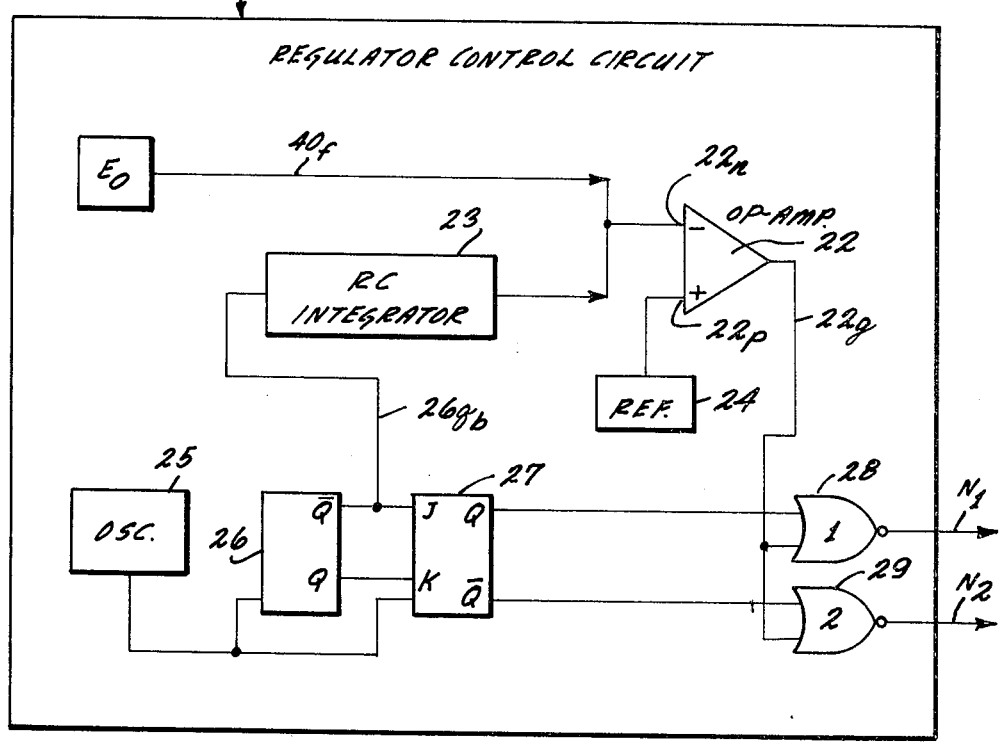
FIG. 3 is a diagram showing the control circuitry for one switching regulator of the power supply system.

FIG. 3 shows in greater detail the elements of the regulator control circuit $40_c$ of FIG. 2. Referring to FIG. 3, an oscillator 25, which may preferably be set to operate at a frequency of 40 khz. provides clocking pulses to flip-flop 26 and flip-flop 27, which is of the J-K type. The $\bar{Q}$ output of flip-flop 26 is conveyed by line $26_{ab}$ to an RC integrator 23. The output of integrator 23 is combined with the regulated output voltage $E_o$ on line $40_f$ where it is connected to the negative terminal $22_n$ of operational amplifier 22. The positive terminal $22_p$ of operational amplifier 22 is connected to a reference voltage 24 which is scaled to represent the desired regulated output voltage. The output of operational amplifier 22 is connected by line $22_a$ to a pair of NOR gates 28 and 29. The NOR gates 28 and 29 also have inputs from the J-K flip-flop 27 with the Q output going to NOR gate 28 and $\bar{Q}$ output of flip-flop 27 going to NOR gate 29. The output lines of NOR gates 28 and 29 are respectively designated as $N_1$ and $N_2$. These lines may also be seen on FIG. 2 as the output of the regulator control circuit $40_c$.

The RC integrator 23 together with the operational amplifier 22 constitute an analog/digital converter as will be described hereinafter.

Figure 5:
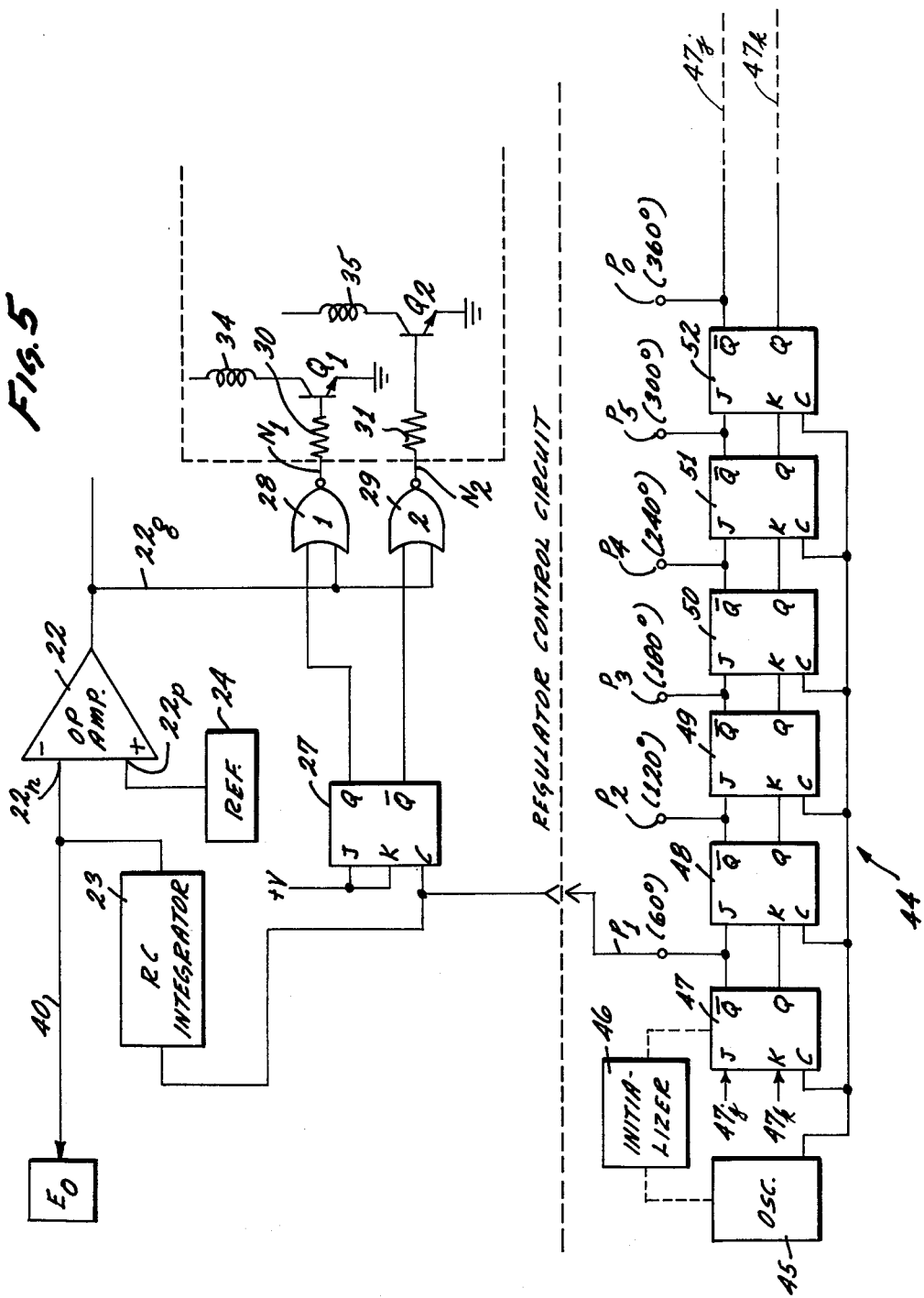
FIG. 5 is a drawing showing how an individual regulator control circuit for a given switching regulator may be timed in order to control the switching of an individual regulator so that it will be in a different phase from the switching of other regulators used for other loads in the power supply system.

In FIG. 5, the basic elements shown in FIG. 3 are substantially duplicated with the exception that the oscillator 25 and flip-flop 26 of FIG. 3 have been removed. The removed oscillator and flip-flop have now been replaced with a timing circuit 44 which includes a ring counter.

Referring to FIG. 5 it will be seen that the two NOR gates 28 and 29 have output lines $N_1$ and $N_2$ which control the switching transistors $Q_1$ and $Q_2$ (as previously seen in FIG. 2). The NOR gates 28 and 29 are controlled by the output of the op-amp 22 and the outputs of the J-K flip-flop 27. In FIG. 5 the clock input to the J-K flip-flop 27 is seen to be controlled by a phasing line $P_1$. An oscillator 45 is provided to give clock pulses to a series of J-K flip-flops 47, 48, 49, 50, 51, 52. This is merely an illustrative example of the number of flip-flops which may be provided since only one may be required or only several may be required depending on the number of loads to be used for attachment to the power supply system. In FIG. 5 there is shown a ring counter wherein a single oscillator 45 clocks a series of flip-flops. Thus, a succession of flip-flops is provided wherein the first flip-flop toggles the next succeeding flip-flop in series sequence. Each flip-flop has a Q and $\bar{Q}$ output, which respectively connects to the J-K inputs of the next succeeding flip-flop. A series of output lines $P_1 P_2$ through $P_5$ and $P_0$ may be taken to provide different phases of triggering to be supplied to the clock inputs of flip-flop 27 for the individual control cards of the plurality of switching regulators. An initializer 46 is used to insure that only one flip-flop will be in the "true" state when power is applied. The centralized oscillator 45 will normally be set to have a much higher frequency (depending on the number of flip-flops in the ring counter) than the frequency of the system of FIG. 3 where oscillator 25 provided the clocking signals.

In FIG. 2 the transistors $Q_1$ and $Q_2$ are connected through transformers $T_1$ and $T_2$ in order to cause the alternate switching of transistors $Q_3$ and $Q_4$ whose collectors are spanned by a transformer $T_3$ having primary winding 33. This arrangement is known as a "push-pull" arrangement for switching regulation.

However, other forms of transistor switching regulation may be used. For example, the output line $22_u$ of FIG. 3 may be directly connected to the base of a single transistor which is used to provide a switching operation according to the duty cycle determined by the output of the operational amplifier 22 and associated gating.

Similarly, the transistors $Q_3$ and $Q_4$ could be replaced with a "balanced bridge" of four transistors which could be switched from windings 34 and 35 of FIG. 2. However, in this case the secondaries of transformers $T_1$ and $T_2$ would consist of two sets of secondary windings each rather than the one set as shown in FIG. 2.

Referring to FIG. 1 a suitable A.C. input voltage, for example, 110 volts A.C., may be supplied to the full wave bridge rectifier 11 and through filtering elements — inductor 12 and capacitor 13 — to provide an output on the D.C. bus line 14 of, for example, 165 volts D.C. with an A.C. ripple voltage of 5 volts RMS. The D.C. bus 14 supplies power to a group of switching regulators $20_a$ through $20_e$, for example, and the number of switching regulators used is determined by the number of separate loads desired to be handled. The switching regulators provide a closely controlled and accurately unswerving D.C. voltage output to each load. For example, D.C. regulated voltage output line $21_a$ supplies load 1; regulated D.C. output line $21_b$ supplies load 2, etc. For large loads, as for example, load 4, two switching regulators $20_d$ and $20_e$ having regulated output lines $21_d$ and $21_e$ are connected to load 4 in parallel to supply the needs of such a heavy load.

Switching regulators are used because they are capable of high efficiency operation even with large changes or differences between the input and output voltages. Even though switching regulatos may have an output ripple, this can be held to a minimum and be at such a high frequency that the ripple can easily be filtered out. The switching regulator is also useful in that it has good qualities for rejection of line transients. The general idea of the switching regulator is that a high efficiency voltage conversion can be provided by using a switching transistor which is turned on and off by a pulsed waveform; and in which the duty cycle of the pulses can be controlled so that incipient output voltage variations can be compensated for. Information about operation and state of the art of switching regulators may be found in various articles such as a brochure published by the National Semiconductor Corporation entitled "Designing Switching Regulators", designated as publication AN-2 by National Semiconductor Corporation, 2900 Semiconductor Drive, Santa Clara, Calif. 95051.

Referring to FIG. 2, there is seen one embodiment of the switching regulator and its intercooperating relationship with the source supply 14, 14g and the output load 1. The regulated output voltage $E_o$ at point 40 branches into line $21_a$ to the load, and line $40_f$ to a regulator control circuit $40_c$. This regulator control circuit $40_c$ provides outputs $N_1$ and $N_2$ which are used to switch transistors $Q_1$ and $Q_2$ alternately on a frequency and duty cycle which is determined by the regulator control $40_c$ to be described in detail hereinafter in connection with FIG. 3.

The high frequency switching of transistors $Q_1$ and $Q_2$ is conveyed as a signal through transformers $T_1$ and $T_2$ to cause similar switching of transistors $Q_3$ and $Q_4$. The transformers $T_1$ and $T_2$ provide isolation between the regulated voltage output side of the power supply and the unregulated D.C. voltage part of the power supply as represented by D.C. bus 14. The high frequency switching of transistors $Q_3$ and $Q_4$ provide pulses transmitted through transformer $T_3$, rectified by 32 and 32' to give a regulated output voltage $E_o$ at point 40. Any variations in the output voltage at point 40 are sensed by the regulator control circuit $40_c$ and used to change the duty cycle but not the frequency of switching of transistors $Q_1$ and $Q_2$. This provides for corrective action to the voltage at point 40 to maintain a constancy.

The methods by which the regulator control circuit $40_c$ controls the duty cycle of the transistors $Q_1$, $Q_2$, $Q_3$, $Q_4$, will be understood by reference to FIG. 3. An operational amplifier 22, having a negative terminal $22_n$ and a positive terminal $22_p$, provides an output line $22_g$, which output line $22_g$ is used as input to two NOR gates 28 and 29.

The NOR gates 28 and 29 are also controlled by an oscillator pulse operating through flip-flop 26 and flip-flop 27 such that the Q output of 27 operates on NOR 28 and the $\overline{Q}$ output of flip-flop 27 operates on NOR 29.

Figure 4:
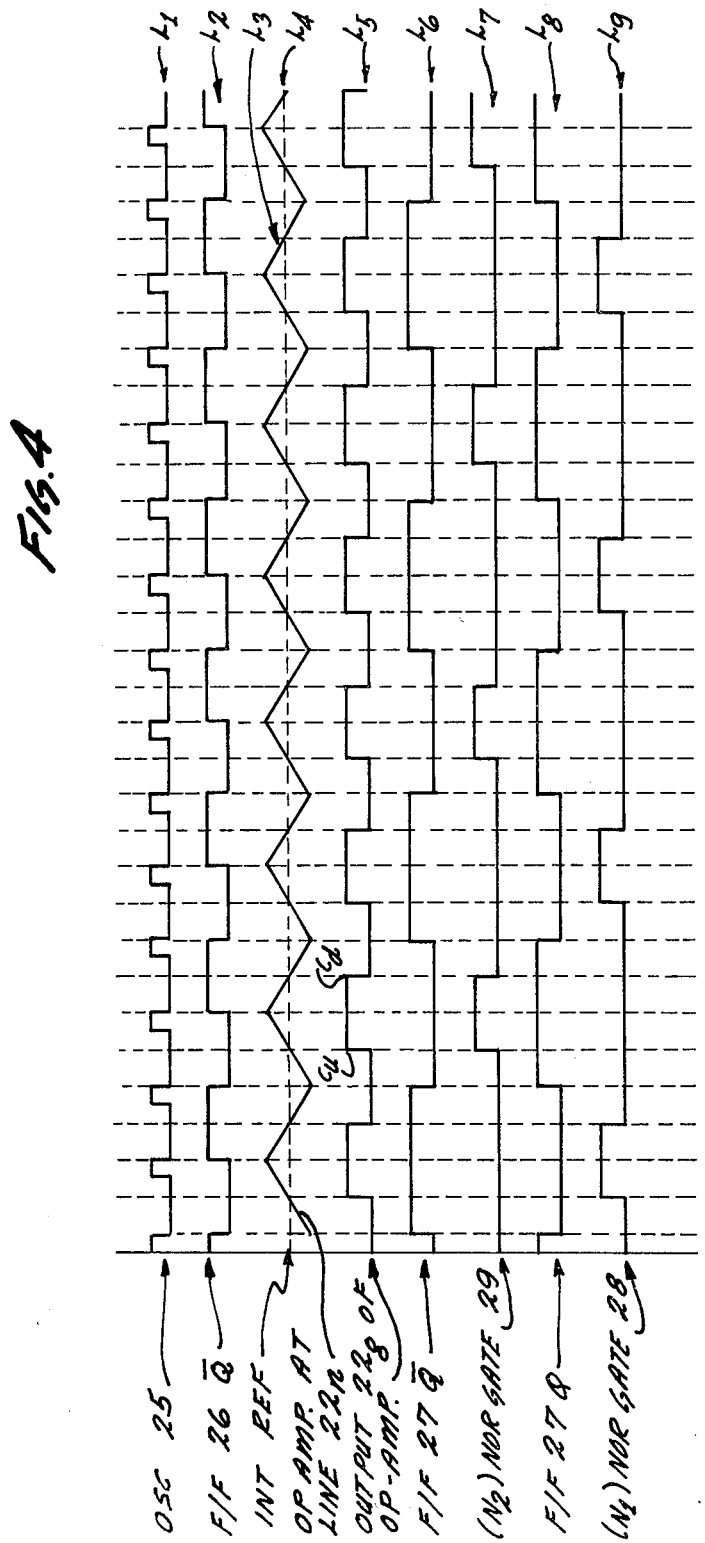
FIG. 4 is a timing diagram showing the form and the timing of various voltage conditions in the regulator control circuit of FIG. 3.

A reference voltage 24 (which is scaled to the desired output setting of the voltage to the load at point 40, FIG. 2) is connected to the positive terminal $22_p$ of the operational amplifier. The negative terminal $22_n$ of the operational amplifier 22 is subject to the summing of two signals, which come from the RC integrator 23 and from the regulated output voltage $E_o$ on line $40_f$. The RC integrator 23 integrates the square wave (on line $26_{qb}$ from the $\overline{Q}$ output of flip-flop 26) and provides a triangular waveform (line L-3 of FIG. 4), thus permitting analog/digital conversion by the operational amplifier. FIG. 4 at line L-5 shows the op-amp output.

Referring to FIGS. 2, 3 and 4, the oscillator 25 operating, for example, at a frequency of 40 kilohertz, provides a clock signal to flip-flop 26 and flip-flop 27. This oscillator clock signal is seen on line L-1 of FIG. 4. Line 2 (L-2) of FIG. 4 shows the $\overline{Q}$ output-pulsing of flip-flop 26. It will be noticed that flip-flop 26 is pulsing at one-half the frequency of the oscillator 25. The $\overline{Q}$ and Q outputs of flip-flop 26 are connected to the J-K inputs of flip-flop 27 in order to enable or to inhibit its toggle action. The $\overline{Q}$ output of flip-flop 26 is also fed into the RC integrator 23 to create the triangular waveform shown in FIG. 4 at line L-3. Line L-4 is a dotted straight line which represents the voltage of the reference 24, which is set to the proper desired output voltage for that given switching regulator of control $40_c$ which is supplied to load 1. The output of the RC integrator 23, shown as a triangular voltage line on line L-3 (FIG. 4), is summed with a D.C. voltage on line $40_f$ (which voltage is proportional to the output level $E_o$ of the regulated supply at point 40). The result of this summing is that the triangular waveform of line L-3 will move up or down relative to the internal reference voltage line shown on FIG. 4 line L-4.

The operational amplifier 22 is designed to sense the points where the rinsing ramp of line L-3 crosses the internal reference line of L-4. This point is marked $C_u$ and shows the "turning-on" point of an output pulse from the op-amp on line $22_g$. Similarly, the down ramp of line L-3, at the point that it crosses the voltage reference line L-4, indicates the pulse "turn-off" point $C_d$ of operational amplifier output line $22_g$. Thus, the on-time (conducting) of a transistor, as $Q_1$, is a proportion only of the total "window" presented by the "off" period of FF27 at its Q output (line 8 of FIG. 4).

Thus, the higher that the triangular line L-3 rises above the reference line L-4, then the longer period of pulse-on time is provided by the operational amplifier output on line $22_g$. Likewise, the lower the line L-3 is with regard to reference line L-4, the smaller the duration of the output pulse (from $C_u$ over to $C_d$). In effect, the integrator 23, reference voltage 24, voltage $E_o$, together with operational-amplifier 22 constitute a form of analog/digital (A/D) converter. The output of the A/D converter is a pulse, the duration of which is inversely proportional to the D.C. output level $E_o$ of the supply; thus, the operational amplifier pulses ahown on L-5 of FIG. 4 have an "on" time which enables NOR gates 28 and 29 of FIG. 3, when these gates are not inhibited by Q and $\overline{Q}$ signals. It should be noted also that the NOR gates 28 and 29 receive Q and $\overline{Q}$ signals from the flip-flop 27. These $\overline{Q}$ and Q pulses from flip-flop 27 are shown on lines L-6 and L-8 of FIG. 4. These pulses coordinate the alternate switching of transistors $Q_1:Q_2$ as well as $Q_3:Q_4$. The $\overline{Q}$ and Q pulses are seen to be one-half the frequency of pulses from flip-flop 26 and one-quarter the frequency of pulses from oscillator 25.

Thus, the "duty cycle" of transistors $Q_1$ and $Q_2$ (FIG. 2) is determined by the output of NOR gates 28 and 29 as seen in FIG. 4, lines L-9 and L-7 respectively. For example, transistor $Q_1$ has a recurring duty cycle period allowed by the "off-time" of Q output of flip-flop 27 (line L-8, FIG. 4). Of this duty cycle period, the actual percent of "on-time" for transistor $Q_1$ is seen at line L-9 (FIG. 4) showing the output of gate 28.

As a result of the inputs from the operational amplifier 22 and from the flip-flop 27, the NOR gates 28 and 29 are switched to provide turn-on signals as shown in FIG. 4 on lines L-9 and L-7. The output lines $N_1$ and $N_2$ of the NOR gates are fed, as shown in FIG. 2, to the "power drivers" or switching transistors $Q_1$ and $Q_2$. This means for switching transistors $Q_1$ and $Q_2$ at the same frequency rate (but 180° out of phase) such that any radio frequency interference (RFI) can easily be filtered out, makes the filtering economical and simple, since only one frequency band needs filtering.

The switching of transistors $Q_1$ and $Q_2$ is reflected in the similar switching of transistors $Q_3$ and $Q_4$ whose pulses are transmitted across transformer $T_3$ and rectified by 32 and 32' to adjust voltage point 40 ($E_o$).

In the situation where a power supply system with a plurality of switching regulators is used to provide regulated power to a multitude of loads, such as shown in FIG. 1, the problem arises as to the deleterious effects on the source power supply if, at the same instant, power is drawn by the switching regulators at the same moment. This would make a heavy surge of demand for power to occur at the same instant, causing transient effects on the D.C. bus and even back into the A.C. power lines with electrical "noise" disruptive to a sensitive computer environment. This problem can be satisfactorily handled by the system shown in FIG. 5 in which the oscillator 25 and flip-flop 26 (of FIG. 3) have been removed and replaced by a ring counter 44 having a common oscillator 45.

Referring to FIG. 5, an oscillator 45 supplies clock pulses to a series of J-K flip-flops 47 through 52. These flip-flops are connected in a series relationship so that the $\overline{Q}$ and Q outputs of one flip-flop will feed the J-K inputs of the next flip-flop. The output lines, $\overline{Q}$ and Q, of flip-flop 52 are seen to be brought around back to the beginning to connect to input lines $47_j$ and $47_k$. An initializer 46 insures that there is always one flip-flop in the "true" condition. A sequential series of output lines $P_1$, $P_2$, $P_3$, $P_4$, $P_5$ and $P_0$, are taken off from the $\overline{Q}$ outputs of successive stages of the flip-flops ($\overline{Q}$) of the ring counter.

Figure 6A:
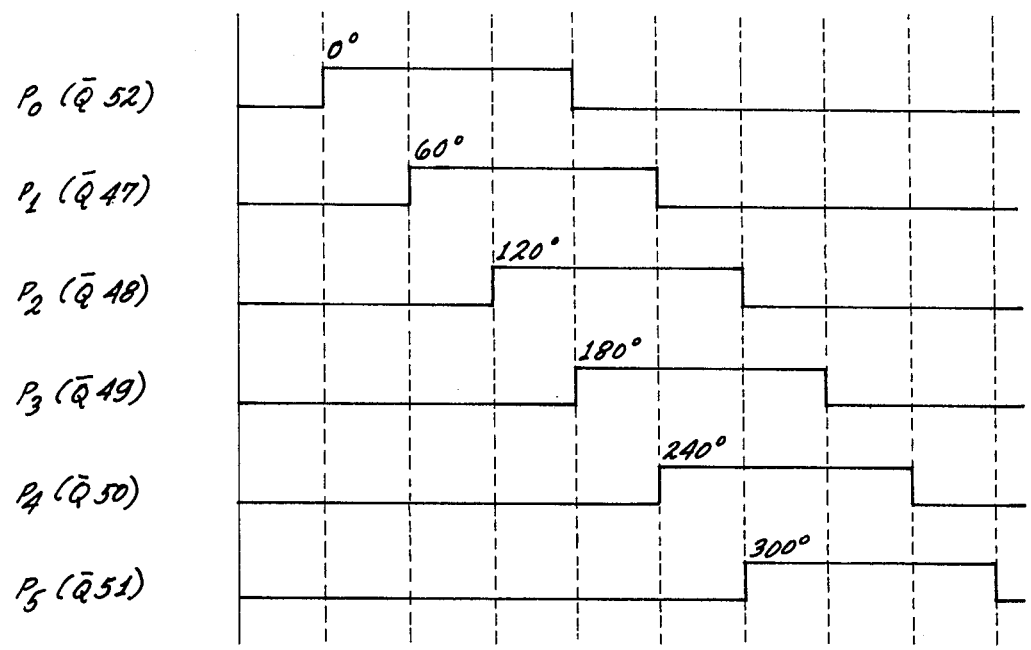
FIG. 6A is a time and phase drawing relating to FIGS. 4 and 5 and illustrates the output pulse control phasing provided by the ring counter.

FIG. 6A illustrates the output pulse relationships on the lines $P_0$ through $P_5$ showing a 60° shift in phase relationship of turn-on as between each of the successive lines. Thus, the $P_1$ line of FIG. 5 is fed to the clock input of flip-flop 27 in order to trigger a particular phase relationship.

If, in the configuration of FIG. 1, there were only to be used two separate loads and two switching regulators, then, for example, the regulator control circuit for load 1 would be switched at 0° (360°) by connecting line $P_0$ to flip-flop 27 clock input. The second load, load 2, would be handled by connecting line $P_3$ (180°) to the corresponding clock of flip-flop 27 of a second regulator control circuit. Thus, the load demand as between the two switching regulators and their respective power supplies could be 180° apart in phase while at the same time the switching frequencies of the transistors $Q_1$ and $Q_2$ (in each of the switching regulators) would still be operating at a common frequency and still could be easily filtered against RFI interference.

Likewise, if a power supply system was used to supply three separate loads, then the phasing lines would be arranged to be 120° apart, such as for example, using line $P_2$ for the first switching regulator control circuit; using phasing line $P_4$ for the second switching regulator control circuit; and using phasing line $P_0$ for the third regulator control circuit. Thus, the power demand of each of these switching regulators would always be phased by 120° even though the switching frequencies of each of the individual switching regulators would all be at the same frequency and could still easily be filtered out to prevent RFI interference.

Figure 6B:
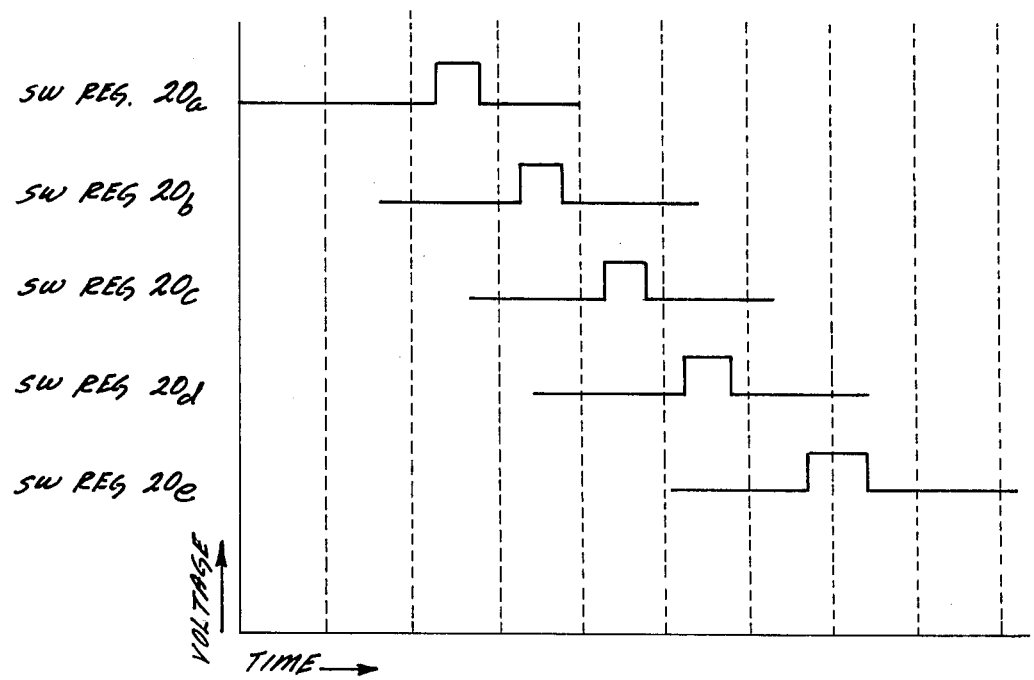
FIG. 6B shows a representative duty cycle on-time for a typical switching transistor in each of the various switching regulators.

FIG. 6B illustrates the situation of a system such as shown in FIG. 1 where five switching regulators are used, all drawing power from a common D.C. bus 14 (FIG. 1). In this situation the phasing supplied to each of the individual switching regulators is 60° apart. Thus, to get a picture of the "on-time" of a typical transistor $Q_1$ for each of the separate and individual switching regulators, it will be seen that the switch-on time of the typical transistor in each one of the switching regulators $20_a$, $20_b$, $20_c$, $20_d$, $20_e$, occurs at a slightly different time from any of the others.

Should the duty cycle of any of two adjacently timed switching regulators be very wide and broad, there is some possibility that there might be some overlap in the power demand as between two closely phased switching regulators. Normally this does not occur as the duty cycle on-time generally remains less than 50 percent of the available cycle. However, even under unusual conditions if the duty cycle on-time should be 50 percent or more, and the system involved five or more switching regulators, there could be a small overlap of power demand as between two of the switching regulators. However, the overall demand of the entire group of switching regulators is such that basically the demand is staggered and maintains an evenness of demand so that there are no significant disturbances to the system.

The above described embodiments of a system for optimizing the noise levels and RFI pollution in a computer environment is illustrative of the described embodiments of the invention. The invention, however, may be embodied in other forms and without diminishment of the scope of the invention, in which the following claims are made:

What is claimed is:

1. A power supply system for supplying a plurality of constant D.C. voltages to a plurality of loads comprising:
   a. means for supplying an unregulated D.C. voltage across a first pair of lines;
   b. a plurality of switching regulators connected across said first pair of lines, each of said switching regulators providing a separate regulated voltage across a second pair of lines to a separate load;
   c. control means for operating said plurality of switching regulators at a common frequency while maintaining phase separation of power demand in each of said plurality of regulators wherein said control means includes:
      c-1. a plurality of individual gating means, at least one for each regulator, to determine the frequency of the switching cycle of that said switching regulator;
      c-2. enabling means for said gating means, said enabling means including:
         common clocking means;

analog/digital conversion means for each regulator for providing digital signals having a duration inversely proportional to the deviation of the regulated output voltage of that regulator from its desired value;

c-3. phasing signal means generated from said common clocking means for enabling each of said gating means at preselected moments in time.

2. The power supply system of claim 1 wherein said control means includes:

first means to enable the on-phase of each switching cycle of each switching regulator so that the on-phase of any one switching regulator will not overlap the on-phase of any other regulator.

3. The power supply system of claim 2 wherein each of said plurality of switching regulators include:

at least one transistor to operate in an on-off switching cycle;

isolation means to provide D.C. isolation of said first pair of lines from the plurality of each second pair of lines;

and wherein said control means includes a second means in each switching regulator to control the duration of the on-time of the said transistor in said each switching regulator.

4. In a regulated power supply system for supplying a plurality of separate unregulated D.C. voltages to a plurality of loads, the combination comprising:

a. means for converting A.C. voltage to an unregulated D.C. voltage;

b. a plurality of switching regulator means for controlling said unregulated D.C. voltage to provide a plurality of constant D.C. outputs for delivery to a plurality of loads;

c. control means for determining a common frequency of switching for said plurality of switching regulator means and for determining the switch-on duration time of each cycle of each of said switching regulator means, said control means having individual subcontrol means responsive to the output voltage delivered to each of said loads in order to control the said switch-on duration time for each switching cycle of each of said switching regulators, wherein said control means includes:

common clock generation means;

phased signal generation means derived from said common clock means for generating a plurality of signals which are set to have a predetermined phase relationship, said plurality of signals being used to clock said plurality of switching regulator means;

and wherein said control means provides a subcontrol means for each switching regulator which subcontrol means includes:

c-1. an operational amplifier;

c-2. an integrator;

c-3. a signal proportional to the output voltage of the individual switching regulator at its load;

c-4. a reference voltage;

c-5. a plurality of gates;

said operational amplifier receiving signals from said integrator and said proportional output voltage, said integrator being clocked by a preselected phase signal from said phased signal generation means, said gates being controlled by combined signals from said operational amplifier and from said preselected phase signals of said phased signal generation means.

* * * * *

UNITED STATES PATENT OFFICE
CERTIFICATE OF CORRECTION

Patent No. 4,034,232          Dated July 5, 1977

Inventor(s) Orville W. LaVenture

It is certified that error appears in the above-identified patent and that said Letters Patent are hereby corrected as shown below:

Col. 1, line 15, change "systems" to --system--.
Col. 2, line 2, change "differences" to --difference--;
        line 8, change "operational" to --operation--.
Col. 3, line 6, change "to" to --two--;
        line 50, change "$26_{gb}$" to --$26_{qb}$--.
Col. 4, line 25, change "Q", second occurrence, to --$\bar{Q}$--;
        line 27, change "$P_1P_2$" to --$P_1, P_2$--.
Col. 5, line 11, change "regulatos" to --regulators--;
        line 30, change "14g" to --$14_g$--.
Col. 6, line 34, change "rinsing" to --rising--.
Col. 7, line 28, change "of" to --or--.

Signed and Sealed this

*Fourth* Day of *October 1977*

[SEAL]

*Attest:*

RUTH C. MASON          LUTRELLE F. PARKER
*Attesting Officer*      *Acting Commissioner of Patents and Trademarks*